United States Patent [19]

Mayer et al.

[11] 4,097,452
[45] Jun. 27, 1978

[54] 14-SUBSTITUTED 7,15-DIAZADISPIRO-[5.1.5.3]-HEXADECANES AS UV STABILIZERS

[75] Inventors: Norbert Mayer, Gersthofen; Gerhard Pfahler, Augsburg; Hartmut Wiezer, Gersthofen, all of Germany

[73] Assignee: Hoechst Aktiengesellschaft, Frankfurt am Main, Germany

[21] Appl. No.: 769,331

[22] Filed: Feb. 16, 1977

[30] Foreign Application Priority Data

Feb. 20, 1976 Germany .............................. 2606819

[51] Int. Cl.$^2$ ................................................ C08K 5/34
[52] U.S. Cl. ............................................. 260/45.8 N
[58] Field of Search ................................ 260/45.8 N

[56] References Cited

U.S. PATENT DOCUMENTS

| 3,901,886 | 8/1975 | Schwartz et al. | 260/45.8 N |
| 4,007,156 | 2/1977 | Ramey et al. | 260/45.8 N |
| 4,007,157 | 2/1977 | Ramey et al. | 260/45.8 N |

OTHER PUBLICATIONS

Bull. Che. Soc. Japan 36 34 (1963), R. Sudo and S. Ichihara.
Monatshefte für Chemie — 106, pp. 1167 to 1173 (1975) — H. Egg.

Primary Examiner—V. P. Hoke
Attorney, Agent, or Firm—Connolly and Hutz

[57] ABSTRACT

By incorporating a substituted diazadispiro-hexadecane into a plastic composition the heat and light stability of this composition is considerably increased.

7 Claims, No Drawings

14-SUBSTITUTED 7,15-DIAZADISPIRO-[5.1.5.3]-HEXADECANES AS UV STABILIZERS

The present invention relates to the use of 7,15-diazadispiro-[5.1.5.3]-hexadecanes substituted in the 14 position of the formula

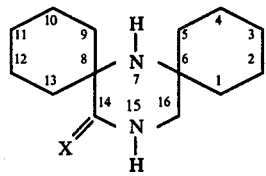

wherein X means $=O$, $=NH$ or

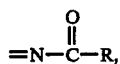

R being an alkyl group with 1 to 17 carbon atoms, preferably the methyl group, for the stabilization of organic matter against the decomposition by light and heat.

The compounds to be used according to the invention are known and may be prepared from cyclohexanone according to processes which have been described by R. Sudo and S. Ichihara in "Bull. Che. Soc. Japan" 36, 34 (1963) and by H. Egg in "Monatshefte für Chemie," 106, pages 1167 – 1173 (1975).

Said diazadispirohexadecanes confer a high stability against decomposition by ultraviolet radiation, light and heat upon organic matter, especially synthetic organic polymer compositions. The color properties of the polymer compositions are not affected detrimentally by the presence of said compounds.

Synthetic organic polymer compositions to be protected against the detrimental action of light and heat include preferably in this context polyolefins free from halogens, for example polyisoprene, polybutadiene, polystyrene and especially polypropylene and polyethylene of high and of low density, moreover ethylene/propylene, ethylene/butene, ethylene/vinyl acetate, styrene/butadiene and acrylonitrile/styrene/butadiene copolymers as well as chlorine-containing polymers. The latter include especially polyvinyl chloride and polyvinylidene chloride, moreover copolymers of vinyl chloride and vinylidene chloride with vinyl acetate or other olefinically unsaturated monomers. Further polymer compositions may be polyacetals, polyesters, for example polyethylene terapthalate, polyamides, for example nylon-6, nylon-6,6 and nylon-6,10 polyurethanes and epoxy resins.

The quantity of the 7,15-diazadispiro[5.1.5.3]-hexadecanes substituted in the 14 position to be added to the synthetic polymer compositions depends on the nature, the properties and the special application purposes of the polymer to be stabilized and varies considerably. In general a quantity of 0.01 to 5, preferably of 0.1 to 3 and especially of 0.15 to 3% by weight, calculated on the synthetic polymer, is used. One compound may be used as well as a mixture of several representatives of one group.

The compounds are incorporated into the synthetic polymers in usual manner. The stabilizer may be mixed with the synthetic polymer, as a dry powder, or a solution, suspension or emulsion of the stabilizer may be incorporated into a solution, suspension or emulsion of the synthetic polymer.

The hexadecane cmpounds proposed for the stabilization are efficient both when used solely and when used in admixture with usual light and heat stabilizers based on phenolic, sulfidic and phosphorus-containing antioxidants.

Usual stabilizers may include, for example, 3,6-di-tert-butyl-p-kresol, 3,5-di-tert-butyl-4-hydroxyphenyl-propionic acid ester, alkylidene-bis-alkylphenols, thiodipropionic acid esters of fatty alcohols as well as dioctadecylsulfide and -disulfide. As phosphorus-containing compound there may be mentioned, for example trisnonyl-phenylphosphite, disstearylpentaerythrityl diphosphite, esters of pentaerythrite-phosphite and others. Examples of UV absorbers are benzotriazole compounds, for example 2-(2'-hydroxy-5'-methylphenyl)-benzotriazole, examples of quenchers are novel piperidine stabilizers and metal chelates.

An efficient stabilizer combination for poly-$\alpha$-olefins free from halogens, for example high pressure, medium pressure and low pressure polymers of $C_2$ - $C_4$ $\alpha$-olefins, especially polyethylene and polypropylene or copolymers of such $\alpha$-olefins, may be composed, calculated on 100 parts by weight of polymer, for example of 0.1 to 3 parts by weight of one of the compounds to be used according to the invention, 0.05 to 3 parts by weight of a phenolic stabilizer as well as optionally 0.01 to 3 parts by weight of a phosphite and/or 0.01 to 3 parts by weight of a UV stabilizer selected from the group of alkoxyhydroxybenzophenones, hydroxyphenylbenzotriazoles, salicylic acid phenyl ester, benzoic acid hydroxyphenyl ester, benzylidene malonic acid mononitrile ester, of the so-called quenchers, such as nickel chelates or hexamethylphosphoric acid triamide.

The addition of the hexadecane compounds in the presence of metal compounds known as stabilizers, epoxy stabilizers, phosphites and optionally polyhydric alcohols also improves the heat and light stability in the stabilization of chlorine-containing vinyl-homo- and -copolymers, for example polyvinyl chloride, polyvinylidene chloride, polyvinylchloroacetate, vinyl chloride- $\alpha$olefin copolymers and chlorinated polyolefins, for example chlorinated polyethylene and polypropylene.

Suitable metal compounds known as stabilizers are, in this context, calcium, barium, strontium, zinc, cadmium, magnesium, aluminum and lead soaps of aliphatic carboxylic acids or of oxycarboxylic acids with about 12 to 32 carbon atoms, salts of said metals with aromatic carboxylic acids, for example benzoates or salicylates as well as (alkyl)phenols of these metals, moreover organotin compounds, for example dialkyltinthioglycolates and -carboxylates.

Known epoxy stabilizers are, for example epoxidized higher fatty acids, for example epoxidized soy bean oil, tallic oil, lin seed oil or epoxidized butyloleate as well as epoxides of long chained $\alpha$-olefins.

Examples of phosphites are trisnonylphenyl phosphite, trislaurylphosphite or esters or ethers of pentaerythritol phosphite.

Suitable polyhydric alcohols are, for example, pentaerythritol, trimethylol propane, sorbitol or mannite, i.e. preferably alcohols with 5 to 6 carbon atoms and with 3 to 6 OH groups.

A stabilizer combination suitable for the stabilization of halogen-containing polymers is composed, calculated on 100 parts by weight of polymer, for example, of 0.1 to 10 parts by weight of metal compounds known as stabilizers, 0.1 to 10 parts by weight of a known epoxy stabilizer, 0.05 to 5 parts by weight of a phosphite, 0.1 to 1 part by weight of a polyhydric hydric alcohol and of 0.01 to 5 parts by weight of one of the compounds to be used according to the invention.

The following example illustrate the invention:

EXAMPLE 100 parts by weight of polypropylene having a melt index $i_5$ of about 6 g/10 minutes (determined according to ASTM D 1238-62 T) and a density of 0.96 g/cm³ were mixed with 0.10 part by weight of a bis-(4'-hydroxy-3'-tert-butyl-phenol)-butanoic acid ester 0.15 part by weight of laurylthiodipropionic acid ester 0.20 part by weight of calcium stearate and 0.30 part by weight of the stabilizer to be examined and homogenized on a two roller calender at 200° C for 5 minutes. The plastic melt was rolled at 200° C to yield a plate having a thickness of 1 mm. Test specimens were punched from the cooled plate according to DIN (= German industrial standard) 53 455.

Comparative test specimens were prepared in an analogous manner without using a stabilizer.

For determining the light stability the test specimens were exposed to light of varying intensity in a weatherometer (Xenotest —150$^R$) of Messrs. Original Hanau Quarzlampen GmbH. The radiation intensity was moduled by 6 IR windows and by 1 UV window (according to DIN 53 387). The time of exposure (endurance) in hours was measured, after which the absolute elongation at break had dropped to 10%. The elongation at break was determined with a tension test machine of Messrs. Instron at a take-away speed of 5 cm/minute.

The results are summarized in the following table:

| stabilizer to be examined | time of exposure (hours) |
|---|---|
| 7,15-diaza-14-imino-dispiro-[5.1.5.3]hexadecane | >800 |
| 7,15-diaza-14-oxo-dispiro [5.1.5.3]-hexadecane | >800 |
| (without stabilizer- comparative test) | 560 |

What is claimed is:

1. Process of stabilizing an organic polymer against decomposition by light and heat, which comprises adding to the polymer 0.1 – 5% by weight thereof of a stabilizer of the formula

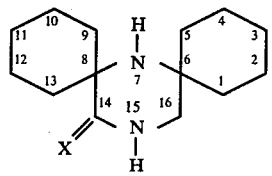

wherein X is = O, = NH or

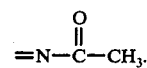

2. Process of stabilizing an organic polymer against decomposition by light and heat, which comprises adding to the polymer 0.1 – 5% by weight thereof of a stabilizer of the formula

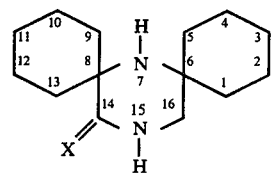

wherein X is = O, = NH or

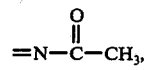

and a conventional organic polymer stabilizer.

3. Process of claim 1 wherein the polymer is a polyolefin.

4. Process of claim 1 wherein the polymer is a chlorine-containing polyolefin.

5. Plastics compositions consisting of a polyolefin, a chlorine-containing polyolefin, a polyacetal, polyester, polyurethane or epoxy resin and as stabilizer 0.1 – 5% by weight of the polymer of a compound of the formula

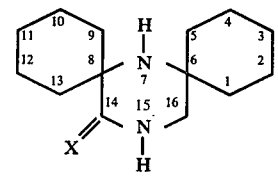

wherein X is = O, = NH or

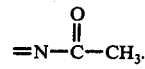

6. Composition of claim 5 wherein the polymer is a polyolefin.

7. Composition of claim 5 wherein the polymer is a chlorine-containing polyolefin.

* * * * *